US006188533B1

United States Patent
Yoshida

(10) Patent No.: US 6,188,533 B1
(45) Date of Patent: Feb. 13, 2001

(54) DATA READING METHOD, RECORDING MEDIUM USED IN THE METHOD AND STORAGE APPARATUS USING THE METHOD

(75) Inventor: Osamu Yoshida, Higashine (JP)

(73) Assignee: Fujitsu Ltd., Kawasaki (JP)

( * ) Notice: Under 35 U.S.C. 154(b), the term of this patent shall be extended for 0 days.

(21) Appl. No.: 09/049,459

(22) Filed: Mar. 27, 1998

(30) Foreign Application Priority Data

Oct. 20, 1997 (JP) .................................................. 9-287346

(51) Int. Cl.[7] .................................................. G11B 15/18
(52) U.S. Cl. ..................... 360/69; 360/77.08; 360/53; 360/78.04; 714/718; 714/54
(58) Field of Search .................... 360/78.04, 53, 360/60, 69, 27, 55, 77.08, 77.11, 77.07; 714/54, 718, 42, 712, 715

(56) References Cited

U.S. PATENT DOCUMENTS

| 5,581,418 | * | 12/1996 | Hasebe ........................... 360/77.08 X |
| 5,710,677 | * | 1/1998 | Teng et al. ........................ 360/77.08 |
| 5,731,924 | * | 3/1998 | Yun .................................... 360/77.08 |
| 5,818,654 | * | 10/1998 | Reddy et al. ................. 360/77.08 X |

FOREIGN PATENT DOCUMENTS

| 62-28977 | 2/1987 | (JP) . |
| 62-86586 | 4/1987 | (JP) . |
| 63-152070 | 6/1988 | (JP) . |
| 2-24880 | 1/1990 | (JP) . |
| 3-252962 | 11/1991 | (JP) . |
| 4-337571 | 11/1992 | (JP) . |
| 7-147663 | 6/1995 | (JP) . |
| 7-254227 | 10/1995 | (JP) . |

* cited by examiner

Primary Examiner—Andrew L. Sniezek
(74) Attorney, Agent, or Firm—Greer, Burns & Crain, Ltd.

(57) ABSTRACT

Desired data recorded in a recording medium is read as a result of a head scanning a desired track, track tracking information for detecting the amount of displacement of said head with respect to the track and address information for identifying the recorded data are also recorded in said recording medium, and the track tracking information and the address information are used so that the head scans the desired track properly. The recording medium is used in which recording medium the track tracking information and the address information is disposed so that the head first scans the track tracking information and then scans the address information. Whether the track, which the head scans, is the desired track is determined from the address information. The amount of displacement of the head with respect to the track is detected from the track tracking information. The desired data is read from the desired track.

6 Claims, 13 Drawing Sheets

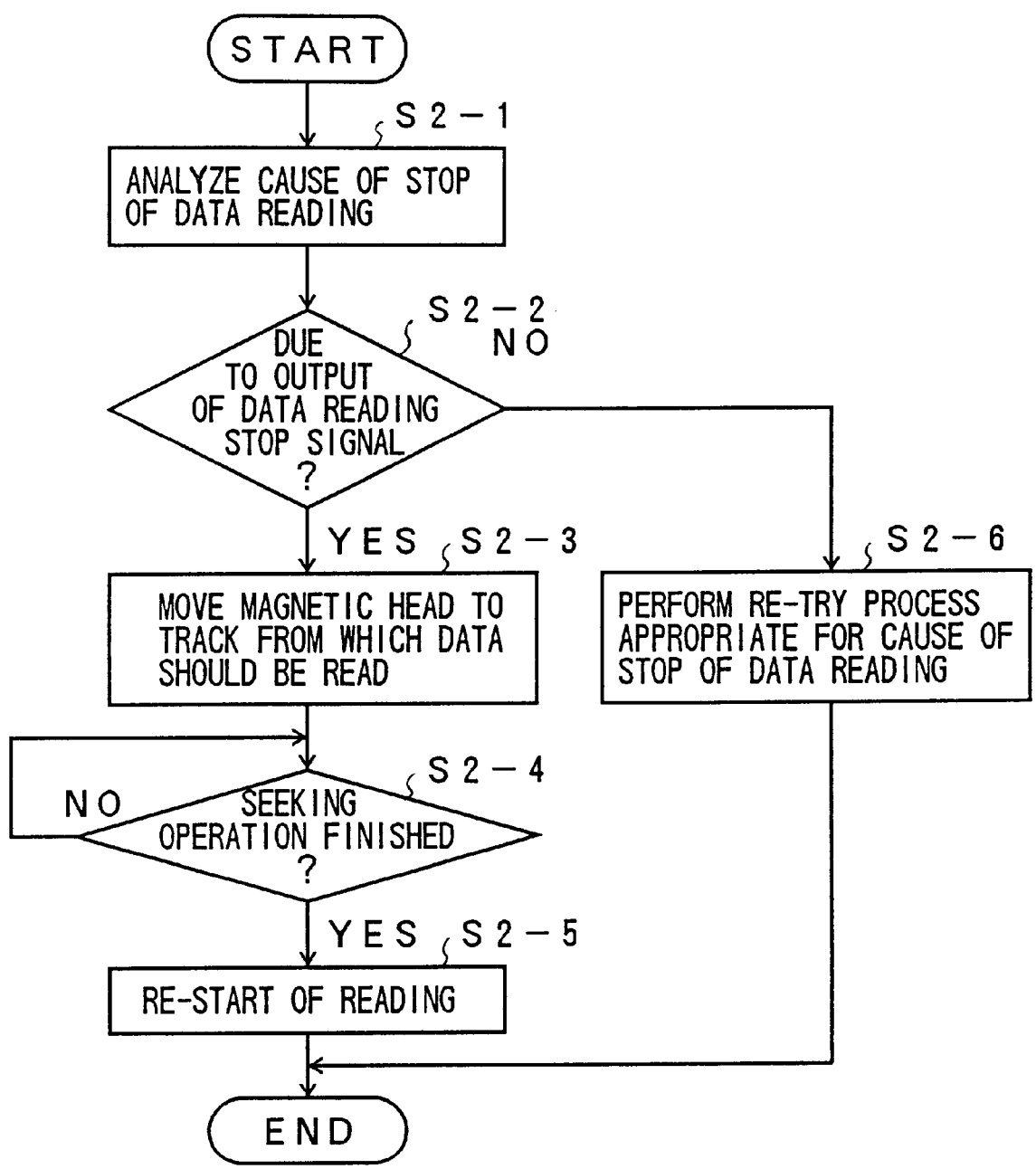

DATA READING METHOD, RECORDING MEDIUM USED IN THE METHOD AND STORAGE APPARATUS USING THE METHOD

BACKGROUND OF THE INVENTION

1. Field of the Invention

The present invention relates to a data reading method, a recording medium used in the method and a storage apparatus (information recording and reproducing device) using the method. In particular, the present invention relates to a data reading method when tracking control is performed using servo information, a recording medium used in the method and a storage apparatus (information recording and reproducing device) using the method.

In a magnetic recording and reproducing device such as a hard disk device, reading of data written in a recording medium should be guaranteed. However, there is a possibility that data written in a recording medium is not properly read due to degradation of the characteristics of the recording medium, adhesion of dirt to the recording medium, damage on the recording medium due to an external shock, external electrical noises or the like.

Commonly, in order to prevent such a situation that written data cannot be properly read, redundant data called an error correction code is added to data. When data is read, error detection and error correction are performed. Thereby, normally, original data can be restored to a certain extent.

Recently, as a recording device has been miniaturized and the storage capacity thereof has been increased, the S/N ratio of a read signal has decreased. Therefore, a restoration function performing data correction using the error correction code has been necessarily enhanced.

For example, in a disk device in about 1985, an ECC (Error Checking Code) for correcting an 11-bit burst error was used; in a disk device in about 1990, an ECC for correcting a 20-bit burst error was used; and in a disk device in about 1995, an ECC for correcting a more-than-40-bit burst error was being used. However, as a side effect of the enhancement of the error correction ability, even information which should not be changed may be erroneously changed by the error correction function.

An object of the present invention is to provide a method for preventing such an erroneous restoration when data is read.

2. Description of the Related Art

FIG. 1 shows a block diagram of an example of a hard disk drive in the related art. FIG. 2A shows a plan view of the hard disk drive after partially removing a top plate thereof. FIG. 2B shows an elevational sectional view of the hard disk drive.

The hard disk drive 1 is connected to a host apparatus 21, and stores, for example, a data processing result of the host apparatus 21. The hard disk drive 1 includes hard disks 2, a spindle motor 3 which rotates the hard disks 2 in the arrow A direction, magnetic heads 4 which perform information recording on the hard disks 2 and information reproduction from the hard disks 2, an arm 5 which holds the magnetic heads 4, and an actuator 7 which rotates the arm 5 in the arrow B directions about a rotation shaft 6 so as to move the magnetic heads 4 in radial directions of the hard disks 2. (Actually, as shown in FIG. 2B, the hard disk drive 1 includes the plurality of hard disks 2 and the plurality of magnetic heads 4. However, for the sake of simplification, FIG. 1 shows only one hard disk 2 and one magnetic head 4.) The hard disk drive 1 further includes a read/write control portion 8 which supplies recording signals to and receives reproduced signals from the magnetic heads 4, a formatter control portion 9 which is connected with the read/write control portion 8 and formats the reproduced signals into reproduced data and formats recording data into the recording signals, a data buffer 10 which temporarily stores the recording data and reproduced data, a data buffer control portion 11 which controls storage of the recording data and reproduced data in the data buffer 10, an I/F control portion 12 which acts as an interface between the host apparatus 21 and the hard disk drive 1, and a servo control portion 13 which performs servo control of the spindle motor 3 and the actuator 7. The hard disk drive 1 further includes an MPU (Micro Processing Unit) 14, a ROM 15 and a RAM 16 which are used for controlling the total operation of the hard disk drive 1

Data to be recorded on and data reproduced from the hard disks 2 are transmitted from and received by the host apparatus 21 via the magnetic heads 4, read/write control portion 8, formatter control portion 9, data buffer control portion 11, data buffer 10, and I/F control portion 12.

On each of the hard disks 2, a plurality of tracks are formed concentrically. Information is recorded on the tracks and recorded information is reproduced from the tracks. Each track is divided into a plurality of frames.

FIGS. 3A and 3B show an example of the arrangement of the hard disk 2 of the hard disk drive 1 in the related art.

As shown in FIG. 3A, the plurality of tracks Tr1 through Trn are formed on each hard disk 2. Each track is divided into a plurality of frames S1 through Sm.

The plurality of frames S1 through Sm are formed as a result of dividing each hard disk 2 by every predetermined angle. As shown in FIG. 3B, each frame includes a servo information area SB and a data area D.

In each servo information area SB, servo information is recorded. The servo information is used for controlling the position of each magnetic head 4 so that each magnetic head 4 can scan a desired track.

FIG. 4 shows an example of the data arrangement of the servo information recorded on the hard disks 2 of the hard disk drive 1 in the related art.

As shown in FIG. 4, the servo information area SB includes an AGC (Automatic Gain Control) area 17 in which an AGC signal for automatically adjusting the amplification factor for the reproduced signal read through the magnetic head 4 is recorded. The servo information area SB further includes an SM (Servo Mark) area 18 in which a servo mark SM indicating the start of information is recorded and a cylinder area 19 in which a cylinder address for identifying the track is recorded. The servo information area SB further includes a position area 20 in which track tracking information is recorded, which information is patterns for detecting an amount of displacement of the magnetic head 4 with respect to the track.

In the AGC area 17, an AGC signal, '1010 . . . 1010' is recorded for 90 clock pulses. In the SM area 18, the servo mark SM, '1000 . . . 00' is recorded for 18 clock pulses.

In the cylinder area 19, the cylinder address, '100X00X00 . . .' (each 'X' is a value, '0' or '1', in accordance with the cylinder address) of a so-called Gray code, is recorded for 99 clock pulses. Further, in the position area 20, the track tracking information, consisting of three patterns, each having a width approximately half the track width, is recorded for 240 clock pulses.

FIG. 5 shows an example of the data arrangement of the position area 20 of each track of the hard disks 2 of the hard disk drive 1 in the related art.

In the position area 20, a pattern A is recorded on the arrow-C-direction side of the cylinder-area-side of the track Trx-1, for the width half the track width for 80 clock pulses. Then, a pattern B is recorded on the arrow-D-direction side of the track Trx-1, for the width half the track width for 80 clock pulses. Then, a pattern C is recorded so that the center of the pattern C is the same as the center of the track Trx-1, for the width half the track width for 80 clock pulses.

The track tracking information, the patterns A, B and C, shown in FIG. 5, is recorded at the corresponding positions of each track of the hard disks 2.

In the hard disk drive 1, the servo information is read through the magnetic heads 4, and the servo control portion 13 controls the positions of the magnetic heads 4 so that the magnetic heads 4 scan desired tracks of the hard disks 2.

FIG. 6 shows an example of the operation flowchart of the servo control portion 13 of the hard disk drive 1 in the related art.

For a track of one of the hard disks 2, when the servo mark SM in the SM area 18 is detected (in a step S3-1), the cylinder address is read from the cylinder area 19 and the servo control portion 13 determines (in a step S3-2) whether or not the read cylinder address is the same as an expected address, that is, the address of desired data. When it is determined in the step S3-2 that the read cylinder address is the same as the address of the desired data, then the patterns A, B and C of the track tracking information are read from the position area 20, and the servo control portion 13 detects the amount of displacement of the magnetic head 4 with respect to the track, from the detected levels of the patterns A, B and C (in a step S3-3).

For example, when the detected levels of the patterns A, B and C, shown in FIG. 5, are the same as each other, it can be determined that the magnetic head 4 scans the desired track. When the detected level of the pattern B is low and the detected level of the pattern C is high, it can be determined that the magnetic head 4 is displaced in the arrow C direction. When the detected level of the pattern B is high and the detected level of the pattern A is low, it can be determined that the magnetic head 4 is displaced in the arrow D direction. In each case, the amount of the displacement is determined from the difference between the detected levels.

Thus, by calculating the differences between the detected levels of the patterns A, B and C, the amount of the displacement can be measured.

After the amount of the displacement is measured in the step S3-3, it is determined (in a step S3-4) whether or not the measured amount of the displacement exceeds a predetermined amount. When the measured amount of the displacement of the magnetic head 4 with respect to the track is smaller than a predetermined amount, for example, a certain amount shorter than the half of the track width, it is possible that the magnetic head 4 is returned to the desired track. Therefore, in a step S3-5, the actuator is driven by tracking control in accordance with the amount of the displacement measured in the step S3-3.

When the measured amount of the displacement of the magnetic head 4 with respect to the track is equal to or more than a predetermined amount, for example, an amount near to the half of the track width, it is not possible for the magnetic head 4 to be returned to the desired track, but the magnetic head 4 may be moved to the adjacent track, if the magnetic head 4 is moved by the tracking control in accordance with the measured amount of the displacement. Therefore, in such a case, the tracking control is not performed.

In the hard disk drive 1 in the related art, an ECC is additionally recorded in the hard disks 2, and, when data is read from the hard disk 2, the ECC is used for determining whether the reproduced data is correct. In the past, a cyclic code, such as a Fire code, which does not have a high error correction ability was used.

Recently, in order to increase a recording medium recording density, the interval between each pair of adjacent data recording tracks is narrowed, and also, the width of each data recording track is narrowed. Thereby, the output level of the signal read from the hard disk 2 is particularly feeble. As a result, the erroneous reading occurrence rate increases. Therefore, it is necessary to improve the ECC error correction ability. For this purpose, recently, a Reed-Solomon code which has a high error correction ability has been used.

However, by increasing the error correction ability, there is a possibility that error correction is performed inappropriately. For example, a case will now be considered where an external shock is applied to the hard disk drive 1 in which the servo information for causing the magnetic head 4 to track a desired track of the hard disk 2 was previously written in the hard disk 2.

By the external shock, the magnetic head 4 may move from the desired track to an adjacent track. In such a case, data of the adjacent track is erroneously read through the magnetic head 4. In such a case, when the magnetic head 4 moves from the desired track to the adjacent track while reading the cylinder address, the cylinder address cannot be adequately read and the ECC is used for obtaining the non-read portion of the cylinder address. When the error correction ability of the ECC is not high, it may not be possible to obtain the non-read portion of the cylinder address. If so, it is determined that the read data is not desired data. However, if the error correction ability of the ECC is high, the non-read portion of the cylinder address may be obtained. Thus, inappropriate error correction may be performed. If so, it is erroneously determined that the read data is the desired data even though the read data is not the data read from the desired track but the data read from the adjacent track.

Thus, there is a possibility that the data of the adjacent track is read and it is erroneously determined that the read data is the desired data. Such inappropriate error correction occurs because the method for detecting movement of the magnetic head between tracks has not been improved although the error correction ability has been improved.

In the related art, in the servo information, as shown in FIG. 4, the track tracking information is read from the position area 20 after the cylinder address is read from the cylinder area 19. By reading the track tracking information, the amount of displacement of the magnetic head 4 with respect to the track is determined as described above. Because Gray code is used for writing the cylinder address, the address of the desired track can be read even if the magnetic head 4 is located at a position near to the center between the desired track and the adjacent track (as shown in FIG. 7).

FIG. 7 illustrates a problem occurring in the hard disk drive in the related art.

As shown in FIG. 7, the position area 20 is scanned after the cylinder area 19 is scanned by the magnetic head 4. As indicated by the broken line in FIG. 7, the magnetic head 4 scans the left (desired) track first, and then, due to the external shock applied to the hard disk drive, the magnetic head passes the center between the two tracks and moves to the right (adjacent) track immediately before the magnetic head 4 completes reading of the cylinder address from the cylinder area 19. In such a case, even though the cylinder address has not been read completely, the ECC, having the high error correction ability, is used and thus, the complete cylinder address of the desired track is obtained. Thus, an inappropriate error correction is performed. As a result, it is determined that the read cylinder address is the same as the desired address. However, the magnetic head 4 reads the track tracking information of the right (adjacent) track. Because it is already determined that the read address is the same as the desired address, the servo control portion 13 performs tracking control so as to cause the magnetic head 4 to track the right (adjacent) track, by controlling the actuator 7, using the track tracking information read from the position area 20 of the right (adjacent) track. Then, the data is read from the data area D of the adjacent track. The data read from the adjacent track is erroneously determined to be the data read from the desired track because it has been already determined that the read address is the same as the desired address.

In the past, even when such a problematic situation occurred, because the cylinder address was additionally recorded in each portion of the data area D, which portion is used by the user as a unit for reading data from and writing data on the hard disk, it could be determined that the read data was not the data read from the desired track as a result of the cylinder address being recorded in each portion of the data area D being checked. However, recently, the cylinder address is not additionally recorded in each portion of the data area D, and the cylinder address is recorded only in the servo information area SB of each frame. Accordingly, the data read from the adjacent track may be erroneously determined to be the data read from the desired track.

SUMMARY OF THE INVENTION

An object of the present invention is to provide a data reading method, a storage apparatus (information recording and reproducing device) and a recording medium, by which erroneous data reading due to inappropriate error correction can be prevented.

In a data reading method according to the present invention, desired data recorded in a recording medium is read as a result of a head scanning a desired track, track tracking information for detecting the amount of displacement of the head with respect to the track and address information for identifying the recorded data are also recorded in the recording medium, and the track tracking information and the address information are used so that the head scans the desired track properly. The method comprises the steps of:
  a) using the recording medium in which the track tracking information and the address information in the recording medium are disposed so that the head first scans the track tracking information and then scans the address information;
  b) determining, from the address information, whether the track, which the head scans, is the desired track;
  c) detecting, from the track tracking information, the amount of displacement of the head with respect to the track; and
  d) reading the desired data from the desired track.

By using the recording medium in which the track tracking information and the address information are disposed so that the head first scans the track tracking information and then scans the address information, when the head moves from a current track (desired track) to an adjacent track due to an external shock before, while or after the track tracking information of the current track is read, it can be considered that the head then reads the address information of the adjacent track, and then, will read the data of the adjacent track. By examining the read address information, it is determined that the head scans the adjacent track. Therefore, it is possible to prevent the data from being read from the adjacent track (not from the desired track). Further, there may be a case where the head scans near or on the center between the current track and the adjacent track. In such a case, the address information may be obtained as the address information of the current track through an ECC although the head finally moves to the adjacent track and will read the data of the adjacent track. In such a case, it is considered that the amount of displacement of the magnetic head 4 with respect to the track is large. Thus, it is possible to determine that the head scans the adjacent track when the detected amount of displacement is large. Therefore, it is possible to prevent the data from being read from the adjacent track (not from the desired track).

The data reading method may further comprise the step e) of stopping data reading in response to the amount of displacement of the head with respect to the track, detected in the step c), having exceeded a predetermined amount.

Thereby, it is possible to prevent data different from desired data from being read.

In the data reading method, step e) may stop data reading immediately after it is detected that the amount of displacement of the head with respect to the track, detected in the step c), has exceeded the predetermined amount.

Thereby, it is possible to prevent data different from desired data from being read. And also, because data reading is immediately stopped, a subsequent operation can be immediately performed.

In the data reading method, the step e) may stop data reading after reading of current data has been finished if it is detected that the amount of displacement of the head with respect to the track, detected in the step c), has exceeded the predetermined amount.

In this arrangement, if it is detected that the amount of displacement of the head with respect to the track has exceeded the predetermined amount, it is possible to prevent the data different from desired data from being transferred to a host apparatus.

In a data reading method according to the present invention, an extent of data is read from a track of a recording medium through a head in accordance with instructions by a host apparatus, and is transferred to the host apparatus. The method comprises the steps of:
  a) reading the extent of data with detection and checking of servo information for each data of the extent of data, the servo information being also recorded in the recording medium;
  b) transferring the read data to the host apparatus except the last data of the extent of data; and
  c) transferring the last data of the extent of data to the host apparatus after confirming that the servo information of the data, which is read immediately after the last data of the extent of data has been read, is normal.

Thereby, the host apparatus can know that the proper data is transferred when the last data of the extent of data has been transferred. The host apparatus can know that the data could not be properly read when the last data of the extent of data has not been transferred.

In the data reading method:

the recording medium may be used in which the servo information comprising track tracking information and address information is disposed so that the head first scans the track tracking information and then scans the address information;

the amount of displacement of the head with respect to the track may be detected from the track tracking information; and when the amount of displacement detected from the track tracking information exceeds a predetermined amount, transfer of data, which was read immediately before the track tracking information was read, to the host apparatus may be prevented.

Thereby, it is possible to eliminate a possibility that data different from desired data is transferred to the host apparatus and to transfer only proper data to the host apparatus. In fact, when the amount of displacement detected from the track tracking information exceeds the predetermined amount, there is a possibility that data, which was read immediately before the track tracking information was read, is data read from an adjacent track and is different from desired data.

In the data reading method:

the recording medium may be used in which the servo information comprising track tracking information and address information is disposed so that the head first scans the track tracking information and then scans the address information;

the amount of displacement of the head with respect to the track may be detected from the track tracking information; and when the amount of displacement detected from the track tracking information exceeds a predetermined amount, transfer of a plurality of data, which was read immediately before the track tracking information was read, to the host apparatus may be prevented.

Thereby, it is possible to more positively eliminate a possibility that data different from desired data is transferred to the host apparatus, and to transfer only proper data to the host apparatus.

In a storage apparatus according to the present invention, a head is caused to scan a desired track of a recording medium in accordance with track tracking information and address information recorded in the recording medium, and either information is recorded in the desired track or information is reproduced from the desired track. The recording medium is used in which recording medium the track tracking information and address information are disposed so that the head first scans the track tracking information and then scans the address information. The device comprises:

displacement amount detecting means for detecting, from the track tracking information, the amount of displacement of the head with respect to the track;

address information detecting means for detecting the address information; and data reading control means for reading the address information so as to determine whether the track which the head scans is the desired track, performing tracking control in accordance with the detected amount of displacement of the head with respect to the track, detected by the displacement amount detecting means, so as to cause the head to properly track the track, and reading the data from the desired track.

By using the recording medium in which the track tracking information and the address information are disposed so that the head first scans the track tracking information and then scans the address information, when the head moves from a current track (desired track) to an adjacent track due to an external shock before, while or after the track tracking information of the current track is read, it can be considered that the head then reads the address information of the adjacent track, and then, will read the data of the adjacent track. By examining the read address information, it is determined that the head scans the adjacent track. Therefore, it is possible to prevent the data from being read from the adjacent track (not from the desired track). Further, there may be a case where the head scans near or on the center between the current track and the adjacent track. In such a case, the address information may be obtained as the address information of the current track through an ECC although the head finally moves to the adjacent track and will read the data of the adjacent track. In such a case, it is considered that the amount of displacement of the magnetic head 4 with respect to the track is large. Thus, it is possible to determine that the head scans the adjacent track when the detected amount of displacement is large. Therefore, it is possible to prevent the data from being read from the adjacent track (not from the desired track).

In the storage apparatus according to the present invention, the data reading control means may stop data reading in response to the amount of displacement of the head with respect to the track, detected by the displacement amount detecting means, having come to be equal to or more than a predetermined amount.

Thereby, data different from desired data is not read.

In a storage apparatus according to the present invention, an extent of data is read from a track of a recording medium through a head in accordance with instructions by a host apparatus, and is transferred to the host apparatus. The device comprises:

servo information detecting means for detecting and checking servo information for each data of the extent of data, the servo information being also recorded in the recording medium; and transfer control means for transferring the read data to the host apparatus except the last data of the extent of data, and transferring the last data of the extent of data to the host apparatus after confirming that the servo information of data, which is read by the servo information detecting means immediately after the last data of the extent of data has been read, is normal.

Thereby, the host apparatus can know that the proper data is transferred when the last data of the extent of data has been transferred. The host apparatus can know that the data could not be properly read when the last data of the extent of data has not been transferred.

In the storage apparatus according the present invention:

the recording medium may be used in which recording medium the servo information comprising track tracking information and address information is disposed so that the head first scans the track tracking information and then scans the address information;

the device may further comprise displacement amount detecting means for detecting, from the track tracking information, the amount of displacement of the head with respect to the track; and when the amount of displacement detected from the track tracking information exceeds a predetermined amount, transfer of data, which was read immediately before the track tracking information was read, to the host apparatus may be prevented.

Thereby, it is possible to eliminate a possibility that data different from desired data is transferred to the host apparatus and to transfer only proper data to the host apparatus. In fact, when the amount of displacement detected from the track tracking information exceeds the predetermined amount, there is a possibility that data, which was read immediately before the track tracking information was read, is data read from an adjacent track and is different from the desired data.

In the storage apparatus according to the present invention:

the recording medium may be used in which recording medium the servo information comprising track tracking information and address information is disposed so that the head first scans the track tracking information and then scans the address information;

the device may further comprise displacement amount detecting means for detecting, from the track tracking information, the amount of displacement of the head with respect to the track; and when the amount of displacement detected from the track tracking information exceeds a predetermined amount, transfer of a plurality of data, which was read immediately before the track tracking information was read, to the host apparatus may be prevented.

Thereby, it is possible to more positively eliminate a possibility that data different from desired data is transferred to the host apparatus and transfer only proper data to the host apparatus.

In a recording medium according to the present invention, at least track tracking information and address information are recorded, the track tracking information and the address information being read through a head, the head scanning a desired track, and data is either recorded in or reproduced from the desired track of the recording medium. The track tracking information and the address information are disposed so that the head first scans the track tracking information and then scans the address information.

By using the recording medium in which the track tracking information and the address information are disposed so that the head first scans the track tracking information and then scans the address information, when the head moves from a current track (desired track) to an adjacent track due to an external shock before, while or after the track tracking information of the current track is read, it can be considered that the head then reads the address information of the adjacent track, and then, will read the data of the adjacent track. By examining the read address information, it is determined that the head scans the adjacent track. Therefore, it is possible to prevent the data from being read from the adjacent track (not from the desired track). Further, there may be a case where the head scans near or on the center between the current track and the adjacent track. In such a case, the address information may be obtained as the address information of the current track through an ECC although the head finally moves to the adjacent track and will read the data of the adjacent track. In such a case, it is considered that the amount of displacement of the magnetic head 4 with respect to the track is large. Thus, it is possible to determine that the head scans the adjacent track when the detected amount of displacement is large. Therefore, it is possible to prevent the data from being read from the adjacent track (not from the desired track).

Other objects and further features of the present invention will become more apparent from the following detailed description when read in conjunction with the accompanying drawings.

BRIEF DESCRIPTION OF THE DRAWINGS

FIG. 13 shows an operation flowchart of a retry process of the servo control portion of the hard disk drive in the embodiment of the present invention.

DETAILED DESCRIPTION OF THE PREFERRED EMBODIMENT

Figure 8:
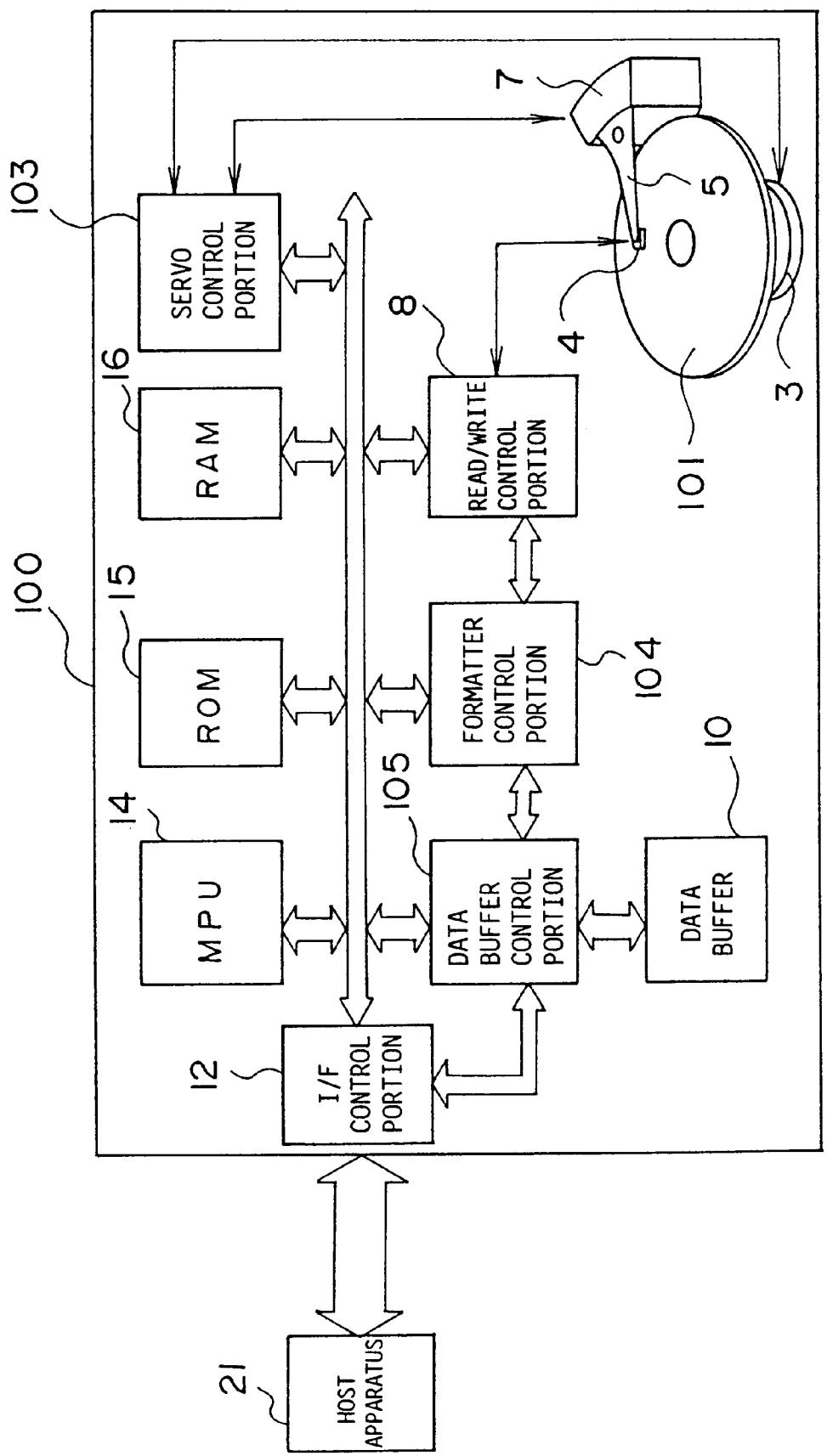
FIG. 8 shows a block diagram of a hard disk drive in an embodiment of the present invention.

FIG. 8 shows a block diagram of a hard disk drive in an embodiment of the present invention. In the figure, the same reference numerals are given to the parts/components the same as those of the hard disk drive 1 shown in FIGS. 1, 2A and 2B, and the descriptions thereof will be omitted.

Figure 1:
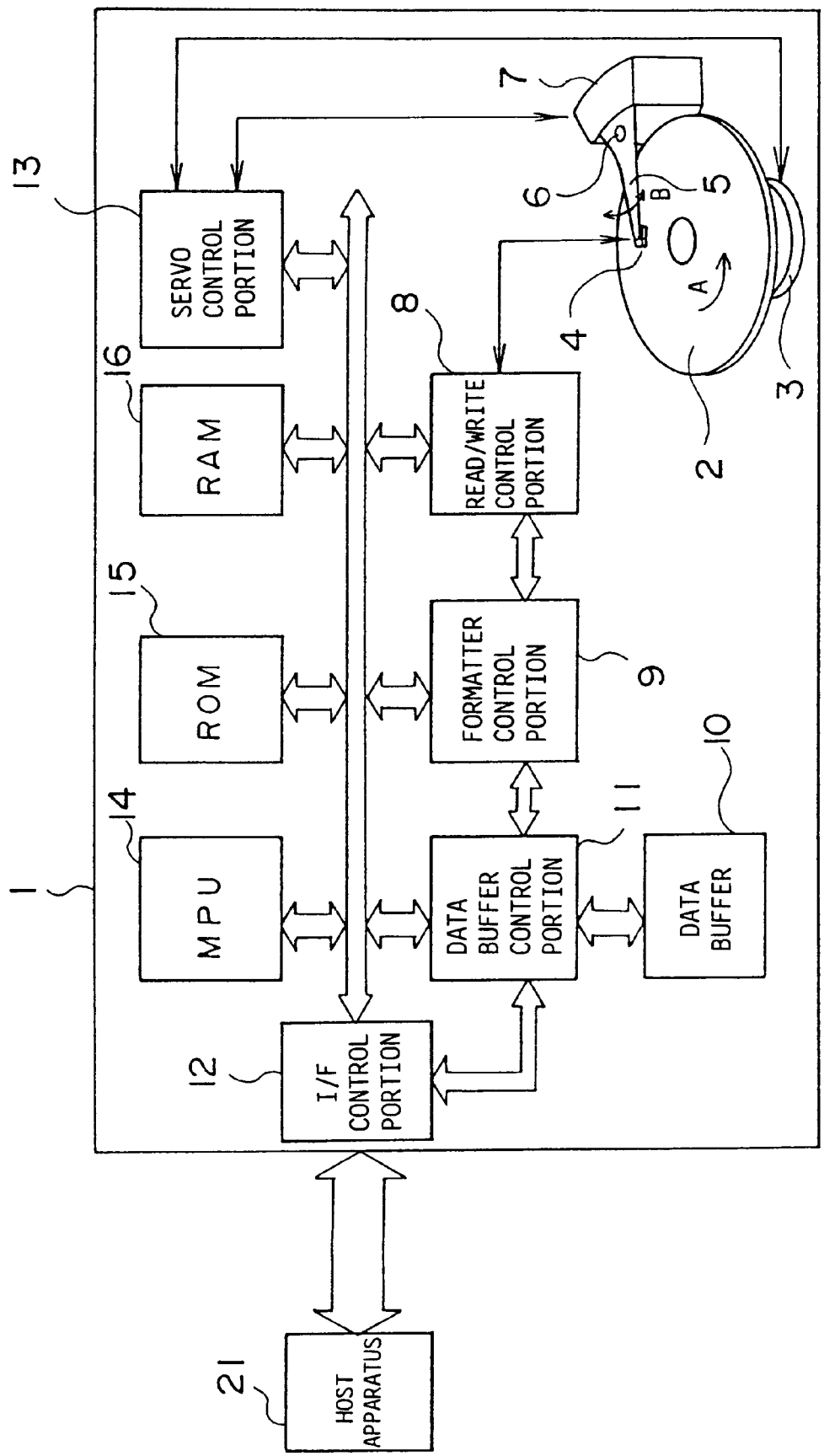
FIG. 1 shows a block diagram of a hard disk drive in one example in the related art.
Figure 2A:
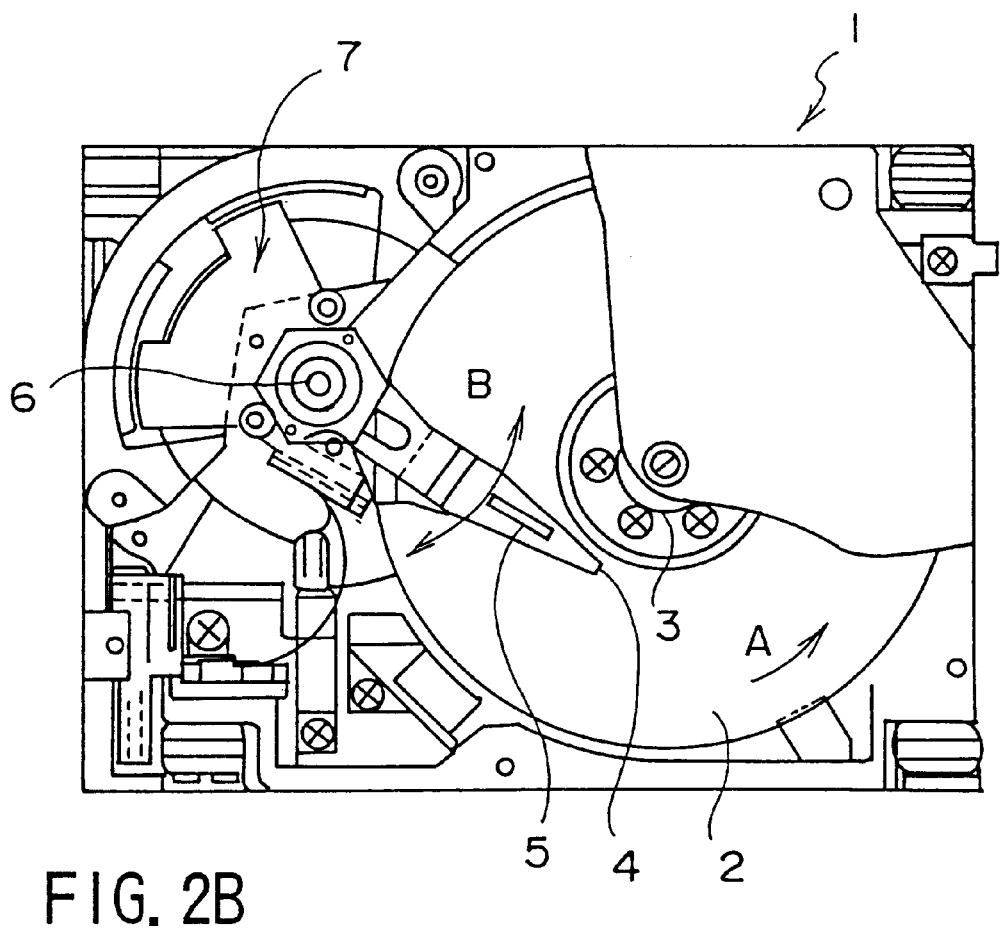
FIG. 2A shows a plan view of the hard disk drive in the example in the related art after partially removing a top plate thereof.
Figure 2B:
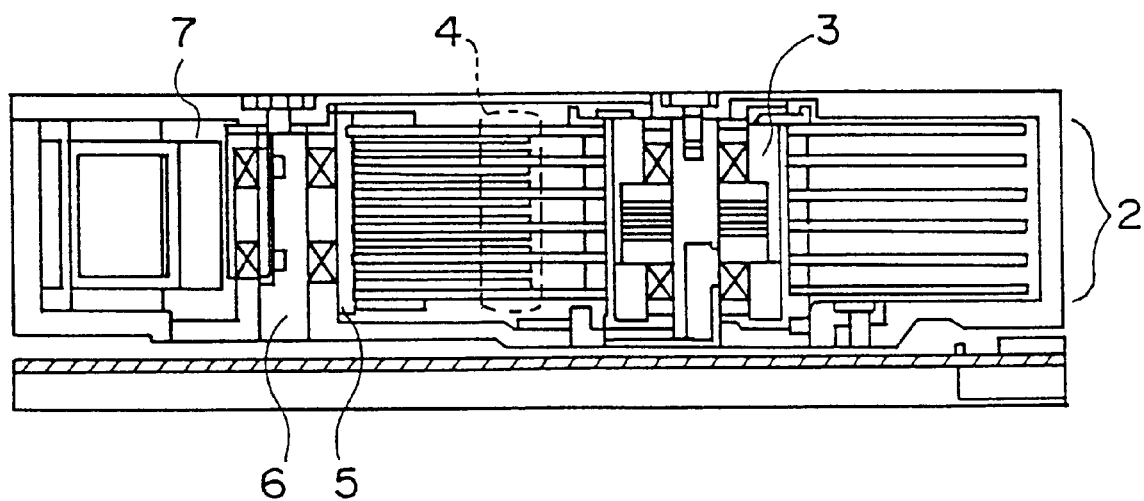
FIG. 2B shows an elevational sectional view of the hard disk drive in the example of in the related art.
Figure 3A:
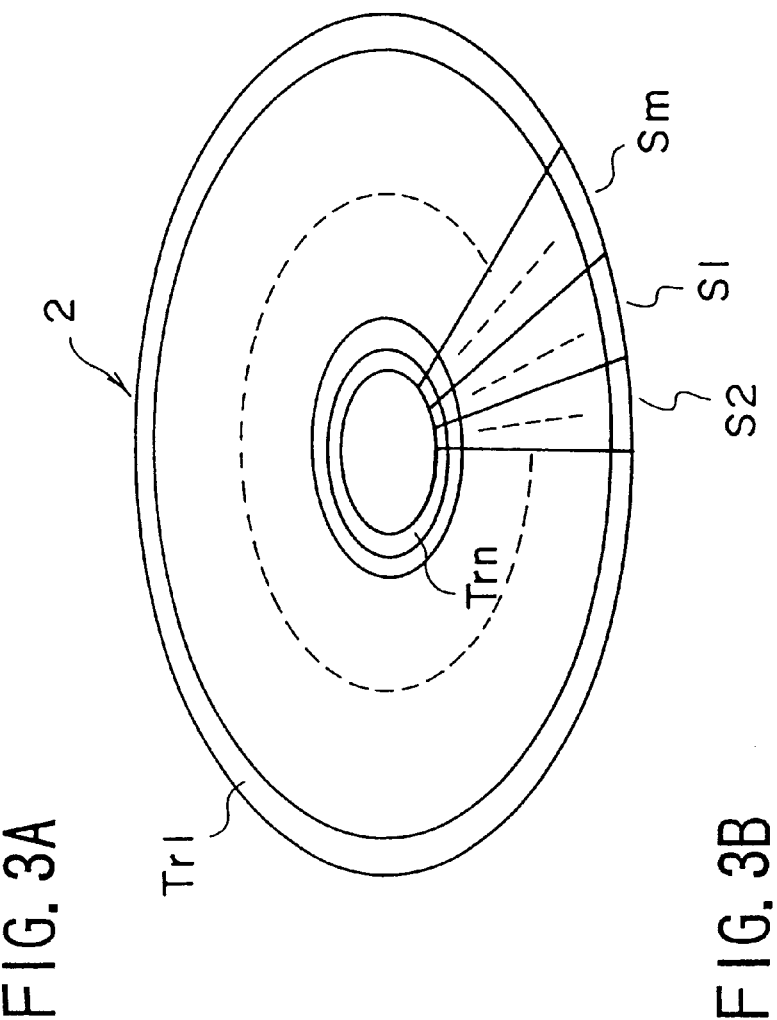
FIGS. 3A and 3B show data arrangements of a hard disk of the hard disk drive in the example of the related art.
Figure 3B:
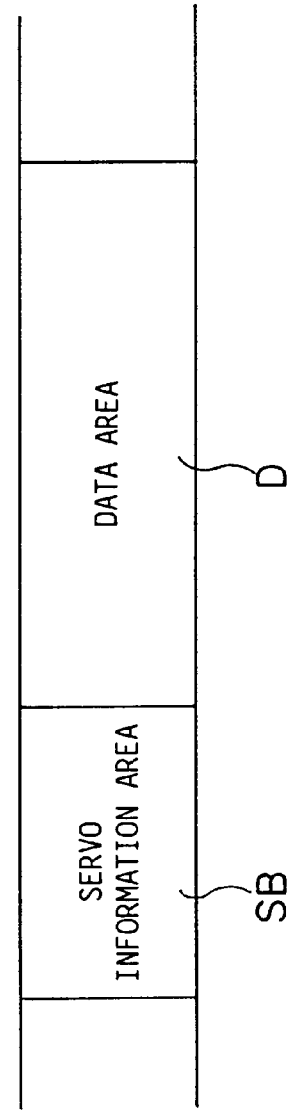

In the hard disk drive 100, acting as a storage apparatus (information recording and reproducing device), in the embodiment of the present invention, the data arrangement of servo information 102 (shown in FIG. 9) recorded on hard disks 101, acting as a recording medium, is different from the data arrangement of servo information recorded on hard disks 2 of the hard disk drive 1 in the related art shown in FIG. 1. (Actually, as shown in FIG. 2B, the hard disk drive 100 also includes a plurality of hard disks and a plurality of magnetic heads. However, for the sake of simplification, FIG. 8 shows only one hard disk 101 and one magnetic head 4.) The operations of a servo control portion 103, a formatter control portion 104 and a data buffer control portion 105 are different from those of the hard disk drive 1 in the related art shown in FIG. 1.

The data arrangement of the servo information 102 recorded on each hard disk 101 of the hard disk drive 100 in the embodiment will now be described.

Figure 4:
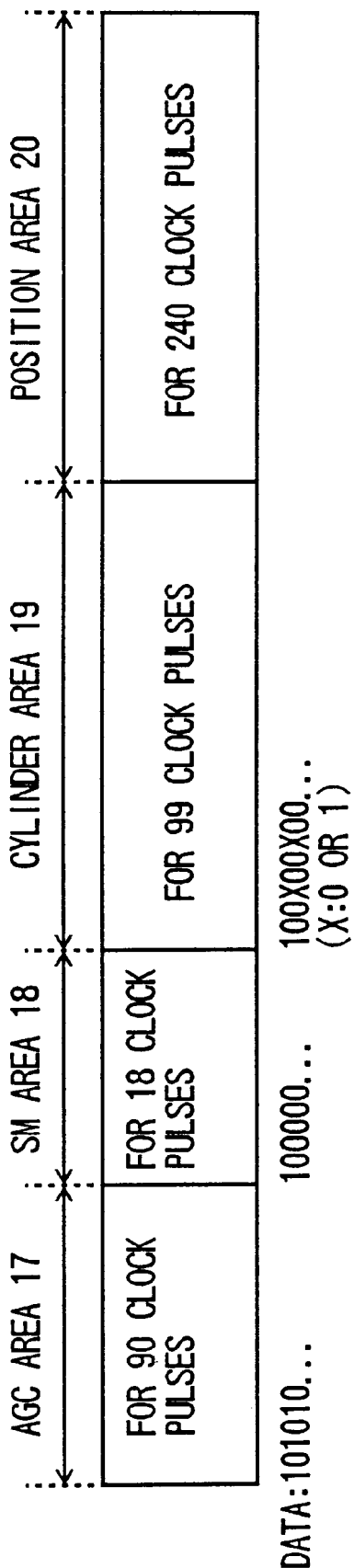
FIG. 4 shows a data arrangement of servo information recorded on the hard disk of the hard disk drive in the example in the related art.
Figure 5:
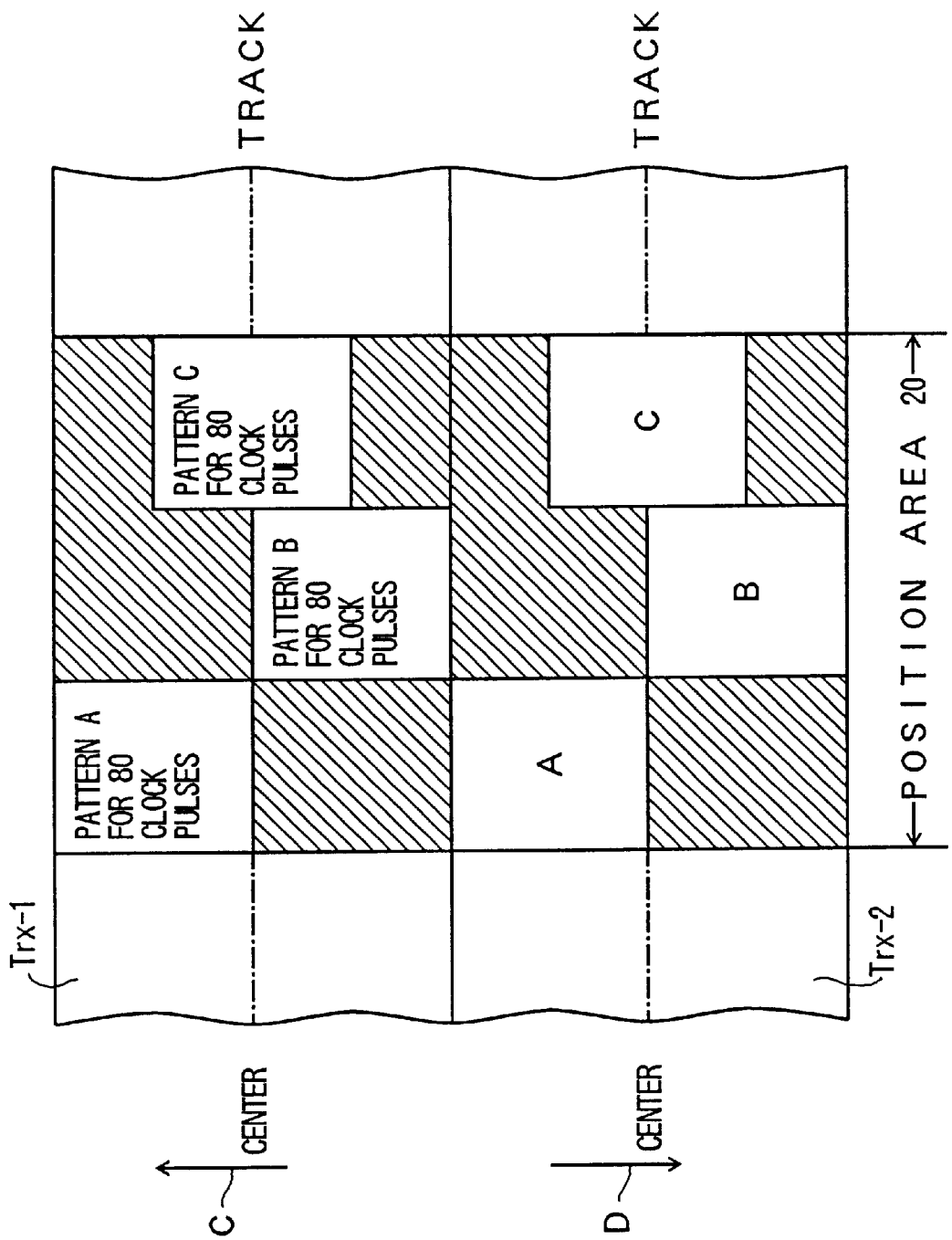
FIG. 5 shows a data arrangement of position information of the servo information.
Figure 6:
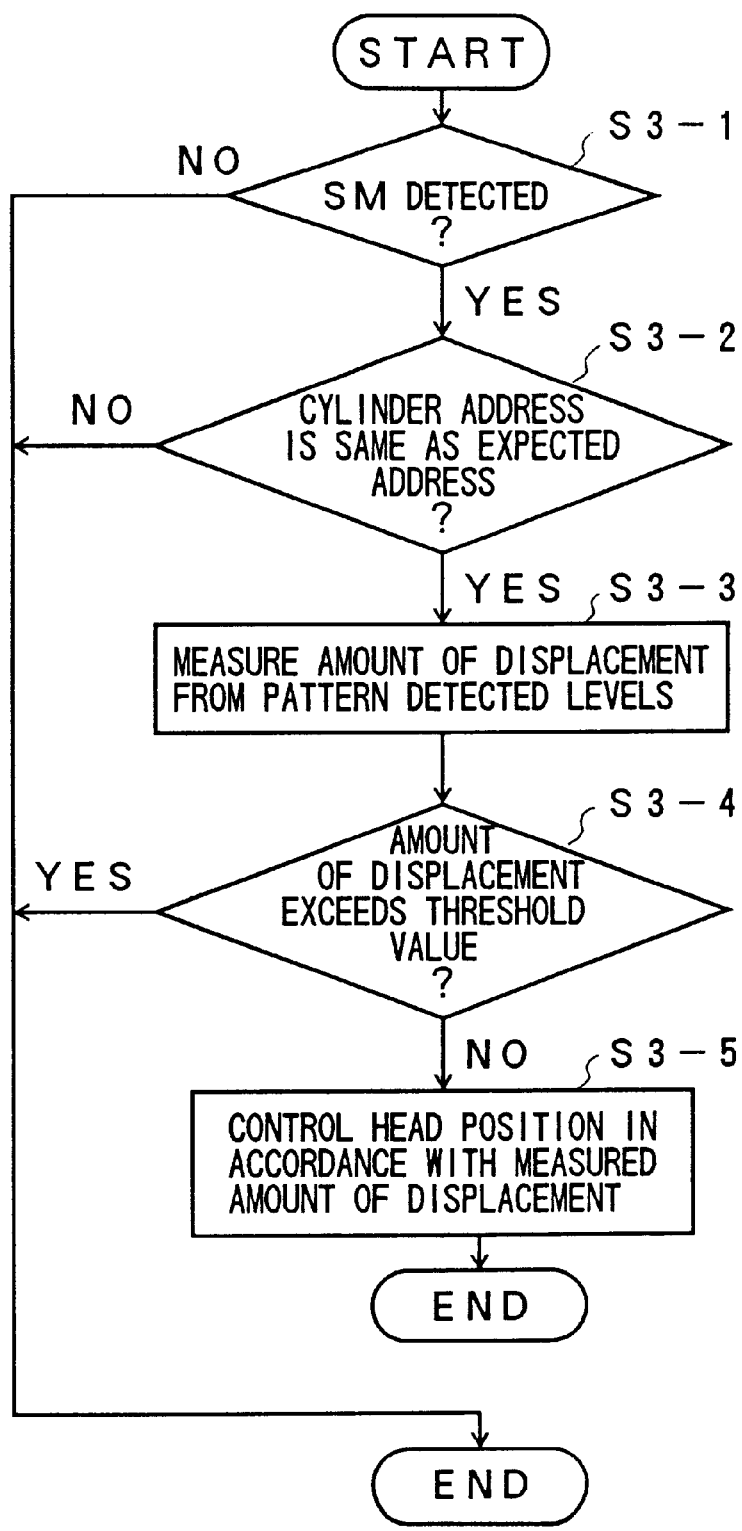
FIG. 6 shows an operation flowchart of the hard disk drive in the example in the related art.
Figure 7:
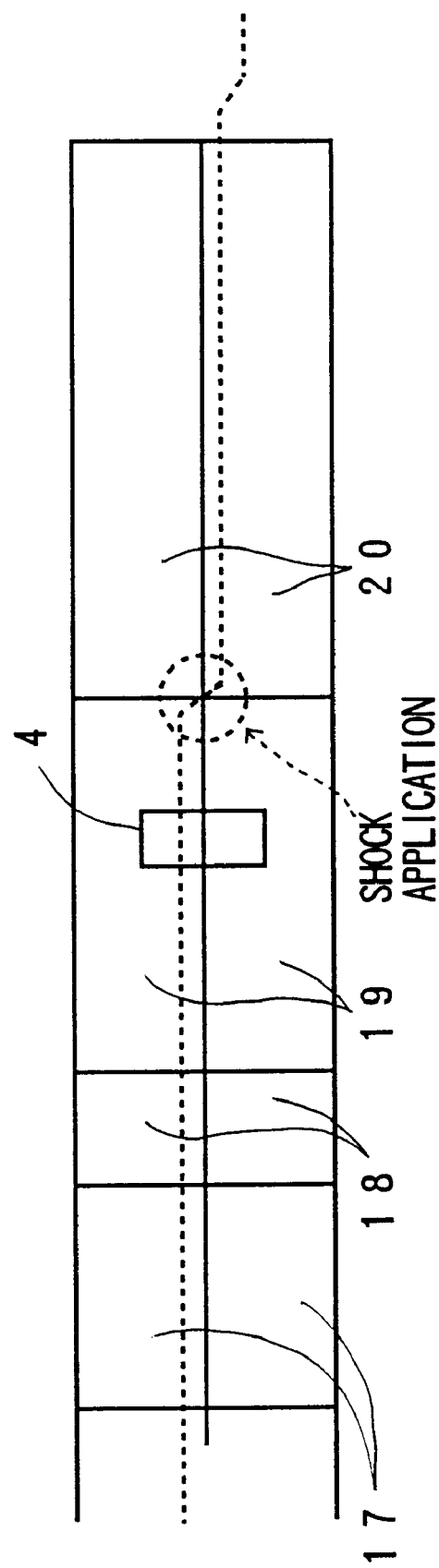
FIG. 7 illustrates a problem occurring in the hard disk drive in the example in the related art.
Figure 9:
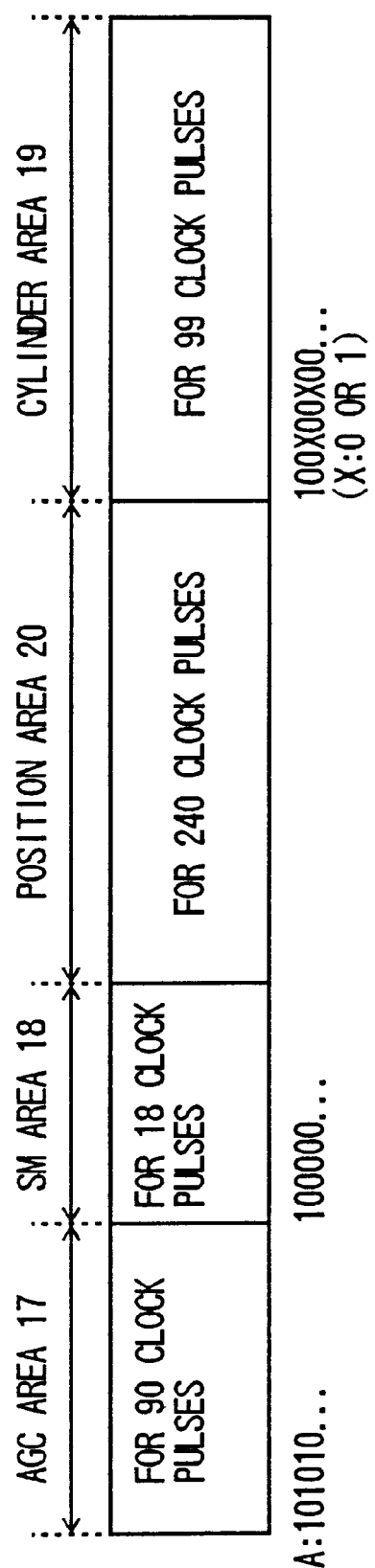
FIG. 9 shows a data arrangement of servo information recorded on each hard disk of the hard disk drive in the embodiment of the present invention.

FIG. 9 shows the data arrangement of the servo information 102 recorded on each hard disk 101 of the hard disk drive 100 in the embodiment of the present invention. In the figure, the same reference numerals are given to the portions the same as those of the servo information shown in FIG. 4, and the descriptions thereof will be omitted. The position area 20 is located after the cylinder area 19 in the servo information in the related art shown in FIG. 4, while the position area 20 is located before the cylinder area 19 in the servo information 102 in the embodiment of the present invention shown in FIG. 9. As mentioned above, the cylinder address is recorded in the cylinder area 19 and the track tracking information is recorded in the position area 20.

Accordingly, after detecting the servo mark SM from the SM area 18, the magnetic head 4 scans the position area 20 and then, scans the cylinder address 19.

In the data arrangement of the servo information 102 shown in FIG. 9, when an external shock is applied to the hard disk drive 100 before the track tracking information is read, and thereby, the magnetic head 4 passes the center between a current track and an adjacent track, the magnetic head 4 then scans the adjacent track. In such a case, the magnetic head 4 scans the position area 20 and then the cylinder area 19 of the adjacent track. Accordingly, the cylinder address of the adjacent track is read, and it can be determined that the magnetic head 4 scans the adjacent track. Thus, a situation that the read cylinder address is the same as the desired address although the magnetic head 4 scans the position area 20 and the data area D of the adjacent track can be prevented from occurring. In fact, when the magnetic head 4 moves from the current track to the adjacent track due to an external shock before, while or after the position area 20 of the current track is scanned, it can be considered that the magnetic head 4 then scans the cylinder area 19 of the adjacent track. Accordingly, by examining the cylinder address read from the cylinder area 19, it is determined that the magnetic head 4 scans the adjacent track and will read the data of the adjacent track. Then, data reading is stopped. Further, there may be a case where the magnetic head 4 scans near or on the center between the current track and the adjacent track. In such a case, the cylinder address may be obtained as the cylinder address of the current track through an ECC although the magnetic head 4 finally moves to the adjacent track and reads the data of the adjacent track. In such a case, it is considered that the amount of displacement of the magnetic head 4 with respect to the track is large.

In the embodiment of the present invention, when it is determined, from the data obtained as a result of the magnetic head 4 reading the position area 20, that the amount of displacement of the magnetic head 4 with respect to the track is equal to or more than a predetermined amount, for example, the width half the track width, data reading is stopped.

Figure 10:
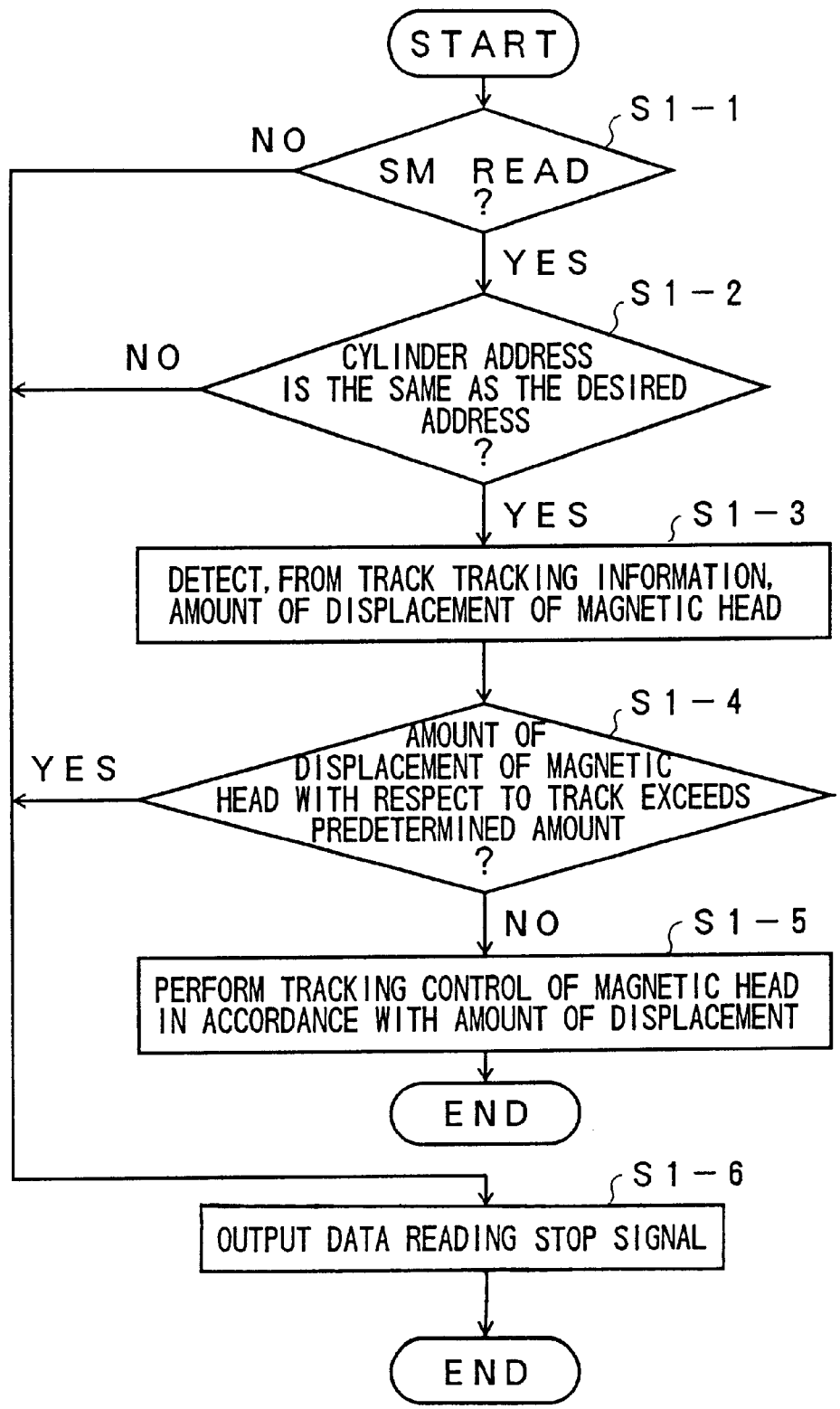
FIG. 10 shows an operation flowchart of a servo control portion of the hard disk drive in the embodiment of the present invention.

FIG. 10 shows an operation flowchart of the operations performed by the servo control portion 103.

The magnetic head 4 scans the SM area 18, position area 20 and cylinder area 19 in the stated order, and thus, reads the servo mark SM, track tracking information and cylinder information therefrom successively. The information thus read through the magnetic head 4 is supplied to the servo control portion 103.

After detecting the servo mark SM from the information supplied by the magnetic head 4 (in a step S1-1), the servo control portion 103 determines (in a step S1-2) whether or not the cylinder address supplied by the magnetic head 4 is the same as the desired address, that is, whether or not the cylinder address is the same as the address of the data which should be accessed.

When it is determined that the cylinder address is the same as the desired address in the step S1-2, the servo control portion 103 detects, from the track tracking information supplied by the magnetic head 4, the amount of displacement of the magnetic head 4 with respect to the track (in a step S1-3).

Then, the servo control portion 103 determines whether or not the amount of displacement of the magnetic head 4 with respect to the track, detected in the step S1-3, exceeds a previously set predetermined amount (for example, the width $½.W$,. half the track width W).

When it is determined in the step S1-4 that the amount of displacement of the magnetic head 4 with respect to the track does not exceed the predetermined amount, the servo control portion 103 controls the actuator 7 in accordance with the amount of displacement of the magnetic head 4 with respect to the track, detected in the step S1-3, and thus, performs tracking control of the magnetic head 4 (in a step S1-5).

When it is determined in the step S1-4 that the amount of displacement of the magnetic head 4 with respect to the track exceeds the predetermined amount, the servo control portion 103 supplies a data reading stop signal to the formatter control portion 104 and data buffer control portion 105 (in a step S1-6). In this case, the tracking control of the magnetic head 4 is not performed.

Instead of the operations shown in FIG. 10, it is also possible that, first, the tracking control of the magnetic heads 4 is performed in accordance with the track tracking information read from the position area 20, and then, the cylinder address is read from the cylinder area 19. In this method, the magnetic head 4 properly scans the track as a result of the tracking control and then the cylinder address can be positively read. If the magnetic head 4 scans an adjacent track (not a desired track) as a result of, for example, the tracking control being performed after the magnetic head 4 has moved from the desired track to the adjacent track before the magnetic head 4 scans the position area 20 due to an external shock, it is determined that the data of the track which the magnetic head 4 scans is the data of the adjacent track. Then, data reading for the current frame is not performed. Thus, it is possible to prevent data of a track different from data of a desired track from being read. In fact, it is not likely that the magnetic head 4 moves to an adjacent track, after the magnetic head 4 scans the center of a current track as a result of the tracking control.

The formatter control portion 104 and data buffer control portion 103 are controlled by the data reading stop signal supplied by the servo control portion 103.

Figure 11:
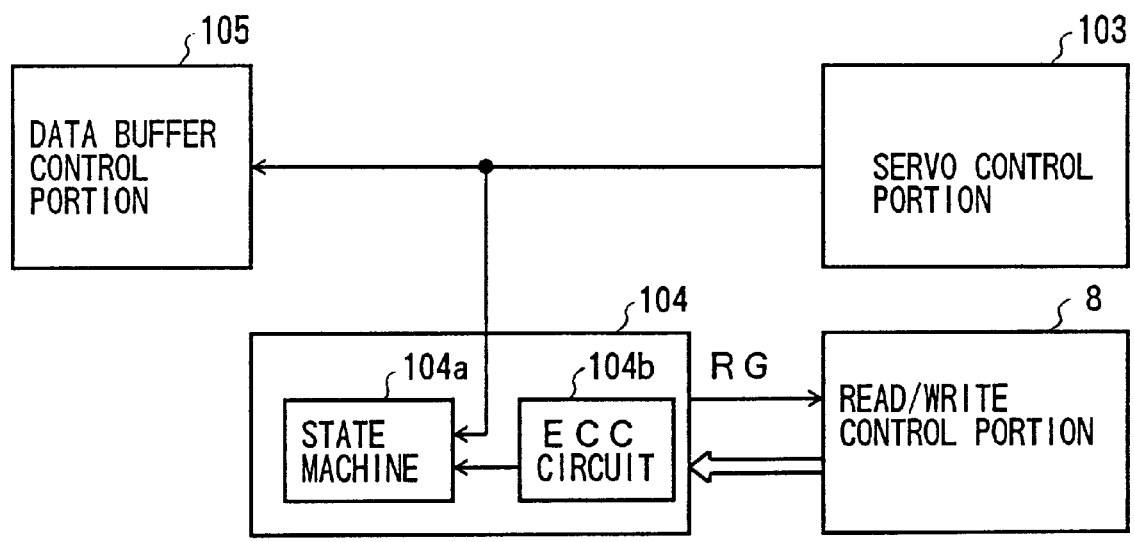
FIG. 11 illustrates operations of a formatter control portion, of the hard disk drive in the embodiment of the present invention, performed as a result of a data reading stop signal being supplied thereto.

FIG. 11 illustrates the operations of the formatter control portion 104 performed as a result of the data reading stop signal being supplied thereto.

The data reading stop signal supplied to the formatter control portion 104 from the servo control portion 103 is supplied to a state machine 104a of the formatter control portion 104.

The state machine 104a stops supply of the read data supplied from the read/write control portion 8 to the data buffer control portion 105, in response to the reception of the data reading stop signal. (An ECC circuit 104b of the formatter control portion 104 performs correction of the data supplied from the read/write control portion 8.)

At the same time, the formatter control portion 104 stops supply of a read gate signal RG to the read/write control portion 8. The read gate signal RG is a signal which is supplied to the read/write control portion 8 when data is read from the magnetic disk 101. Thus, supply of the read data to the formatter control portion 104 from the read/write control portion 8 is caused to be terminated. (In the specification, 'data reading' means 'supply of the read data to the formatter control portion 104 from the read/write control portion 8' by stopping supply of the read gate signal RG to the read/write control portion 8.) Instead, it is also possible that, in response to the reception of the data reading stop signal, the data reading is stopped when the data reading for the current frame is finished and before data reading for the subsequent frame is started.

Further, in response to the reception of the data reading stop signal from the servo control portion 103, the data buffer control portion 105 transfers neither the data of the current frame (including the current servo information) nor the data of the frame (preceding frame), which was read immediately prior to the reception of the data reading stop signal, to the host apparatus 21. In fact, when it is determined, from the servo information, that the magnetic head 4 scans an adjacent track (different from a desired track), it is determined that the magnetic head 4 will scan the data area D of the adjacent track. Therefore, it is determined that the data read through the magnetic head 4 is data which is different from desired data. In such a case, there is a possibility that the magnetic head 4 has scanned the data area D of the preceding frame of the adjacent track. Accordingly, there is a possibility that the data read from the preceding frame is data recorded in the adjacent track, and thus, is different from the desired data recorded in the preceding frame of the desired track. Therefore, by transferring neither the data of the current frame nor the data of the frame which was read immediately prior to the reception of the data reading stop signal, to the host apparatus 21, a possibility that the data different from the desired data is transferred to the host apparatus 21 can be eliminated.

Figures 12A, 12B:
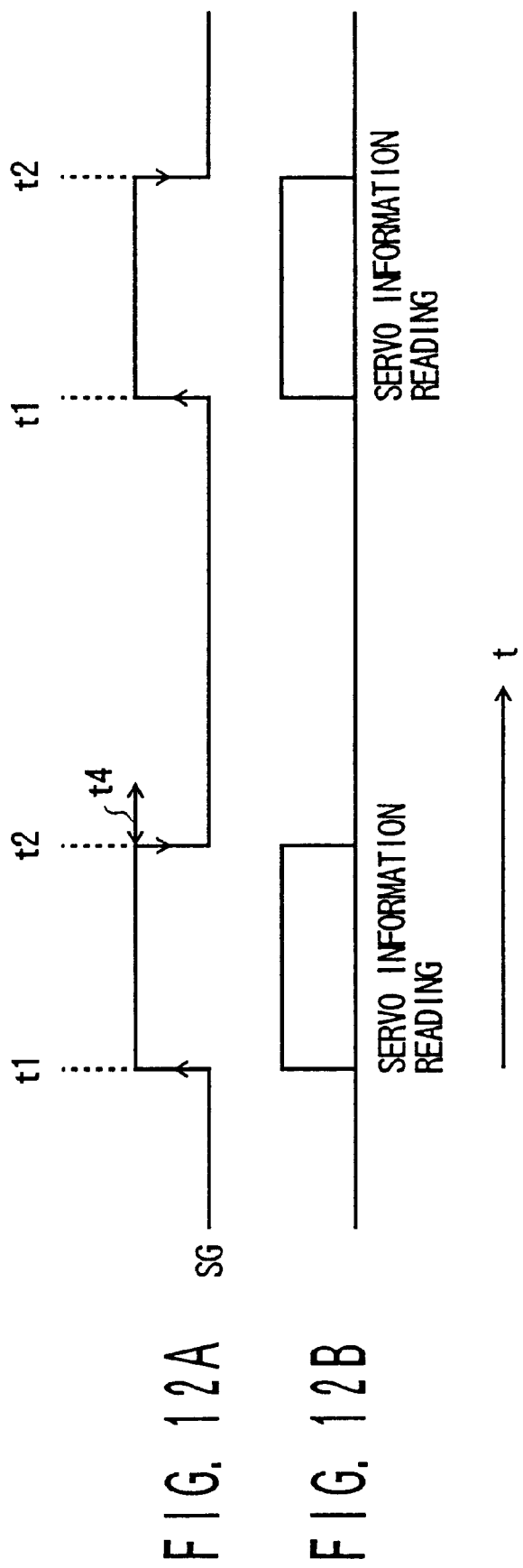
FIG. 12A shows timing of assertion of a servo gate signal in the hard disk drive in the embodiment of the present invention.
FIG. 12B shows timing of the servo information being read through the magnetic head of the hard disk drive in the embodiment of the present invention.

FIG. 12A shows timing of assertion of a servo gate signal SG, and FIG. 12B shows timing of the servo information being read through the magnetic head 4.

When reading of the servo information is started at a time t1, the servo control portion 103 asserts the servo gate signal SG. While the servo gate signal SG is in a high level, the contents and the output level of the read servo information are held in the servo control portion 103 and then appropriately used.

Then, when the reading of the servo information is finished at a time t2, the servo control portion 103 negates the servo gate signal SG, and starts execution of a program for performing the operations shown in FIG. 10.

During a time t4, the program for performing the operations shown in FIG. 10 is executed.

When outputting the data reading stop signal in the step S1-6 of the operations shown in FIG. 10, that is, when it is determined that the data of the data area D of the current frame of the track which the magnetic head 4 scans is different from the desired data, a re-try process is performed.

FIG. 13 shows an operation flowchart of the re-try process performed by the servo control portion 103 in the embodiment of the present invention.

When data reading is stopped, the servo control portion 103 analyzes the cause of the stop of data reading (in a step S2-1).

When it is determined, in a step S2-2, as a result of the analyzing in the step S2-1, that the cause of the stop of data reading is the data reading stop signal being output in the step S1-6 of the operations shown in FIG. 10, the servo control portion 103 performs a seeking operation so as to move the magnetic head 4 to the track of the desired cylinder address (in a step S2-3).

After the seeking operation is finished, the reading operation is started again (in a step S2-5), and the operations shown in FIG. 10 are performed.

When it is determined, in the step S2-2, as a result of the analyzing in the step S2-1, that the cause of the stop of data reading is another cause, that is, for example, it is determined in the step S2-2 that an inappropriate reading condition has prevented proper reading through the magnetic head 4 and thereby the data reading has been stopped, the re-try process is performed in an ordinary manner by appropriately changing the parameter of the reading condition (in a step S2-6).

In the embodiment, as mentioned above, when receiving the data reading stop signal from the servo control circuit 103, the data buffer control portion 105 does not transfer the read data of the immediately preceding frame. However, it is not necessary to be limited to this, and, it is also possible that, when receiving the data reading stop signal from the servo control circuit 103, the data buffer control portion 105 does not transfer the read data of an immediately preceding predetermined number of frames. Thereby, a possibility that the data different from the desired data is transferred to the host apparatus 21 can be more positively eliminated.

The data buffer control portion 105 stores an extent of data, transfer of which is instructed by the host apparatus 21, in the data buffer 10, successively, when the data is supplied from the formatter control portion 104. Then, the data buffer control portion 105 transfers the stored data to the host apparatus 21 successively. Then, after the data of the last frame of the instructed extent of data is supplied to the data buffer control portion 105 from the formatter control portion 104 and is stored in the data buffer 10, the data buffer control portion 105 transfers the data of the last frame to the host apparatus 21 only after it has been determined that the servo information of the first frame, read after the last frame of the instructed extent of data has been read, is normal, that is, only after the result of the step S1-2 is YES and also the result of the step S1-4 is NO in the operations shown in FIG. 10 for the servo information of the first frame read after the last frame of the instructed extent of data has been read. In fact, there is a possibility that, after the cylinder information of the last frame of the instructed extent of data has been read, the magnetic head 4 moves from the current track (desired track) to an adjacent track due to an external shock applied to the hard disk drive 100. In such a case, the data of the data area D of the adjacent track is then read, and it has been erroneously determined that the thus-read data is the data read from the desired track. When the magnetic head 4 moves from the current track (desired track) to an adjacent track after the cylinder information of the last frame of the instructed extent of data has been read, the magnetic head 4 reads the cylinder information of the first frame, read after the last frame of the instructed extent of data has been read, of the adjacent track. As a result, it is determined that the servo information of the first frame, read after the last frame of the instructed extent of data has been read, is not normal. Thus, by transferring the data of the last frame of the instructed extent of data only after it has been determined that the servo information of the first frame, read after the last frame of the instructed extent of data has been read, is normal, it is possible to prevent data different from the data read from a desired track from being transferred to the host apparatus 21.

Thereby, because the data of the last frame of the instructed extent of data has not been transferred, the host apparatus 21 can be informed that all of the instructed extent of data could not be read properly.

Further, when determining that the servo information of the first frame, read after the last frame of the instructed extent of data has been read, is not normal, as mentioned above, the servo control portion 103 performs the re-try process on the last frame of the instructed extent of data. Then, after it is determined that the servo information of the first frame, read after the last frame of the instructed extent of data has been read in the re-try process, is normal, the data buffer control portion 103 transfers the data of the last frame of the instructed extent of data to the host apparatus 21. Thus, only the desired data can be transferred to the host apparatus 21.

Instead of the above-mentioned manner that the data of the last frame of the instructed extent of data is transferred to the host apparatus 21 only after it is determined that the servo information of the first frame, read after the last frame of the instructed extent of data has been read, is normal, the following manner can also be performed. The data buffer control portion 105 stores the data of a previously set predetermined number of frames of the instructed extent of data in the data buffer 10. Then, the stored data is transferred to the host apparatus 21 only after it is determined that the servo information of the first frame, read after the last frame of the predetermined number of frames of the instructed extent of data has been read, is normal. Thus, only the desired data can be transferred to the host apparatus 21.

Thus, in the embodiment of the present invention, it is possible to positively know that the magnetic head 4 has been displaced from a desired track. Further, when it is known that the magnetic head 4 has been displaced from a desired track, the function of the formatter control portion 104 is positively stopped without waiting for knowing that the ECC circuit 104b cannot obtain the complete cylinder address using the ECC. Thereby, it is possible to eliminate a possibility that data different from desired data is read through the magnetic head 4.

The above-described embodiment of the present invention is the hard disk drive acting as a storage apparatus (information recording and reproducing device). However, application of the present invention is not limited to the hard disk drive. The present invention can be applied to any storage apparatus in which tracking control is performed using servo information which includes address information and track tracking information.

Further, the present invention is not limited to the above-described embodiment, and variations and modifications may be made without departing from the scope of the present invention.

What is claimed is:

1. A data reading method in which a specified range of data frames and servo information for the specified range of data frames read from a track of a recording medium through a head in accordance with instructions by a host apparatus, and are transferred to the host apparatus, said method comprising the steps of:
   (a) determining whether servo information of a data frame subsequent to a last data frame of the specified range of data frames corresponds to a target address; and
   (b) transferring said last data frame to the host apparatus only if the servo information of the data frame subsequent to said last data frame corresponds to said target address.

2. The data reading method according to claim 1, wherein:
   the recording medium is used in which the servo information comprising track tracking information and address information is disposed so that said head first scans track tracking information and then scans address information;
   the amount of displacement of said head with respect to the track is detected from the track tracking information; and
   when the amount of displacement detected from the track tracking information exceeds a predetermined amount, transfer of data, which was read immediately before said track tracking information was read, to said host apparatus is prevented.

3. The data reading method according to claim 1, wherein:
   the recording medium is used in which the servo information comprising track tracking information and address information is disposed so that said head first scans the track tracking information and then scans the address information;
   the amount of displacement of said head with respect to the track is detected from the track tracking information; and
   when the amount of displacement detected from the track tracking information exceeds a predetermined amount, transfer of a plurality of data, which was read immediately before said track tracking information was read, to said host apparatus is prevented .

4. A storage apparatus in which a specified range of data frames and servo information for the specified range of data frames are read from a track of a recording medium through a head in accordance with instructions by a host apparatus, and are transferred to said host apparatus, said apparatus comprising:
   servo information detecting means for detecting and checking servo information for a specified range of data frames, said servo information being also recorded in said recording medium; and
   transfer control means for transferring the last data frame of the specified range of data frames to the host apparatus only if the servo information of the data frame subsequent to said last data frame, which is read by said servo information detecting means, corresponds to a target address.

5. The storage apparatus according to claim 4, wherein:
   the recording medium is used in which recording medium the servo information comprising track tracking information and address information is disposed so that said head first scans the track tracking information and then scans the address information;
   said apparatus further comprises displacement amount detecting means for detecting, from the track tracking information, the amount of displacement of said head with respect to the track; and
   when the amount of displacement detected from the track tracking information exceeds a predetermined amount, transfer of data, which was read immediately before said track tracking information was read, to said host apparatus is prevented.

6. The storage apparatus according to claim wherein:
   the recording medium is used in which recording medium the servo information comprising track tracking information and address information is disposed so that said head first scans the track tracking information and then scans the address information;

said apparatus further comprises displacement amount detecting means for detecting, from the track tracking information, the amount of displacement of said head with respect to the track; and when the amount of displacement detected from the track tracking information exceeds a predetermined amount, transfer of a plurality of data, which was read immediately before said track tracking information was read, to said host apparatus is prevented.

* * * * *

UNITED STATES PATENT AND TRADEMARK OFFICE
CERTIFICATE OF CORRECTION

PATENT NO. : 6,188,533 B1  
DATED : February 13, 2001  
INVENTOR(S) : Yoshida

Page 1 of 1

It is certified that error appears in the above-identified patent and that said Letters Patent is hereby corrected as shown below:

Column 15,
Line 56, insert -- are -- between "frames" and "read".

Column 16,
Line 64, insert -- 4 -- between "claim" and "wherein".

Signed and Sealed this

Fourth Day of December, 2001

*Attest:*

NICHOLAS P. GODICI
*Attesting Officer*     *Acting Director of the United States Patent and Trademark Office*